(12) United States Patent
Dai et al.

(10) Patent No.: US 11,429,511 B2
(45) Date of Patent: Aug. 30, 2022

(54) DEVICE AND METHOD FOR REINFORCING CONTROL FLOW INTEGRITY OF SOFTWARE APPLICATION

(71) Applicant: Huawei International Pte. Ltd., Singapore (SG)

(72) Inventors: Ting Dai, Singapore (SG); Yongzheng Wu, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 1 day.

(21) Appl. No.: 16/552,534

(22) Filed: Aug. 27, 2019

(65) Prior Publication Data
US 2019/0384693 A1 Dec. 19, 2019

Related U.S. Application Data

(63) Continuation of application No. PCT/SG2018/050086, filed on Feb. 26, 2018.

(30) Foreign Application Priority Data

Feb. 27, 2017 (SG) .............................. 10201701541S

(51) Int. Cl.
*G06F 11/36* (2006.01)
(52) U.S. Cl.
CPC ...... *G06F 11/3612* (2013.01); *G06F 11/3636* (2013.01); *G06F 11/3644* (2013.01)
(58) Field of Classification Search
CPC ............. G06F 11/3612; G06F 11/3636; G06F 11/3644
See application file for complete search history.

(56) References Cited

U.S. PATENT DOCUMENTS

| 7,577,992 B2 | 8/2009 | Abadi et al. |
| 8,117,660 B2 | 2/2012 | Pan et al. |
| 2010/0192026 A1 | 7/2010 | Abadi et al. |
| 2013/0007881 A1* | 1/2013 | Liem ....................... G06F 21/14 726/22 |
| 2013/0024676 A1 | 1/2013 | Glew et al. |
| 2013/0031364 A1* | 1/2013 | Glew ....................... G06F 21/62 726/1 |
| 2013/0283245 A1 | 10/2013 | Black et al. |
| 2015/0135313 A1 | 5/2015 | Wesie et al. |
| 2015/0356294 A1 | 12/2015 | Tan et al. |
| 2015/0363198 A1* | 12/2015 | Yang ......................... G06F 8/53 717/106 |
| 2015/0370560 A1 | 12/2015 | Tan et al. |
| 2016/0179546 A1 | 6/2016 | Yamada et al. |

(Continued)

OTHER PUBLICATIONS

Mauro Conti et al. "Losing Control: On the Effectiveness of Control-Flow Integrity under Stack Attacks", [Online], pp. 952-963, [Retrieved from Internet on Jun. 22, 2021], <https://dl.acm.org/doi/pdf/10.1145/2810103.2813671> (Year: 2015).*

(Continued)

*Primary Examiner* — Ziaul A Chowdhury
(74) *Attorney, Agent, or Firm* — Leydig, Voit & Mayer, Ltd.

(57) ABSTRACT

This document describes a device and method for a device to reinforce the control flow integrity of a software application as the application is being executed on the device.

22 Claims, 7 Drawing Sheets

(56) References Cited

U.S. PATENT DOCUMENTS

2017/0103210 A1\* 4/2017 Baji-G ............... G06F 21/52
2018/0253547 A1\* 9/2018 Sultana ............... G06F 21/52

OTHER PUBLICATIONS

Jonathan A.P. Marpaung et al., "Survey on malware evasion techniques: state of the art and challenges", [Online], pp. 744-749, [Retrieved from Interent on May 6, 2022], <https://ieeexplore.ieee.org/stamp/stamp.jsp?arnumber=6174775>, (Year: 2012).\*

Aravind Prakash et al., "vfGuard: Strict Protection for Virtual Function Calls in COTS C++ Binaries", [Online], pp. 1-15, [Retirieved from Internet on May 6, 2022], <https://www.ndss-symposium.org/wp-content/uploads/2017/09/11_2_2.pdf> (Year: 2015).\*

Zhang et al., "Practical Control Flow Integrity and Randomization for Binary Executables," 2013 IEEE Symposium on Security and Privacy, pp. 559-573, Institute of Electrical and Electronics Engineers, New York, New York (May 19, 2013).

Tice et al., "Enforcing Forward-Edge Control-Flow Integrity in GCC and LLVM," 23rd Usenix Security Symposium, San Diego, CA, pp. 941-955, Usenix, Berkeley, California (Aug. 20-22, 2014).

\* cited by examiner

DEVICE AND METHOD FOR REINFORCING CONTROL FLOW INTEGRITY OF SOFTWARE APPLICATION

CROSS-REFERENCE TO RELATED APPLICATIONS

This application is a continuation of International Application No. PCT/SG2018/050086, filed on Feb. 26, 2018, which claims priority to Singapore Patent Application No. 10201701541S, filed on Feb. 27, 2017. The disclosures of the aforementioned applications are hereby incorporated by reference in their entireties.

FIELD OF THE INVENTION

This invention relates to a device and method for a device to reinforce the control flow integrity (CFI) of a software application as the application is being executed on the device.

SUMMARY OF THE PRIOR ART

Most software applications are vulnerable to malicious attacks that attempt to alter or change the behaviour of the software application by changing the control flow of the application. Typically, such attacks occur when the software application receives and executes malicious binary code received over regular communication channels. Once executed, the malicious binary codes then alter the application's control flow by exploiting pre-existing software flaws contained within the application. Through the exploitation of such flaws, malicious attackers may then subvert the application. Once the application has been subverted, the malicious attackers will then gain control over the software applications behaviour without the knowledge of the original user.

In particular, worms or viruses may insert themselves into an execution flow of the software application. Once this occurs, the flow from the software-planned course may then be diverted to a course dictated by the worm or the virus. If the software application has a vulnerability that exists at the machine code level, the attack by the worm or the virus may cause the diversion of the execution of software machine code, leading to the execution of an unanticipated sequence of machine code instructions.

Those skilled in the art have attempted to address this problem by reducing or attempting to reduce as many flaws or vulnerabilities in software coding as possible. A downside with such an approach is that it is very difficult for all flaws in a piece of software to be thoroughly and completely eliminated. Other mitigation approaches depend on computer systems independently picking random integers from a large set, and attempting to surround important information or flow data (that an attacker may want to modify) with those random values—such that the attacker must, for a successful attack, make use of the actual values chosen. These approaches cannot guarantee that the attacker will not learn the chosen values, and may be ineffective if an attacker learns or successfully guesses the chosen value. More broadly, such approaches will unlikely prevent attacks that cause a device's memory to be altered.

Therefore, existing solutions still render a software application vulnerable to attacks from viruses, worms, and other attacks that are not dependent on the secrecy of arbitrarily chosen values or attacks that may modify a device's memory.

Return orient programming (ROP) is an advanced attacking method that exploits program vulnerabilities. The ROP method utilizes "gadgets", which is a set of instructions, to achieve arbitrary code execution on the target program. Another advanced attacking method that is known to those skilled in the art is the "return to libc" (ret2libc) attack. In the ret2libc attack method, the attacker redirects a function call in a target software application to another unintended function. These kinds of attacks alter the normal control-flow of the execution of the program.

One of the most popular control-flow transfer attack methods used by attackers is the attacking of the indirect function call in a source code. This is because an attacker may redirect the indirect function call to arbitrary code to initiate a ROP attack or a ret2libc attack. To prevent this from happening, current compiler based CFI methods focus on ensuring that the control-flow transfers that take place at the indirect function call only occur for legitimate function targets. In such methods, even if the attacker were to alter the control-flow, the indirect function call may only call these legitimate targets, instead of arbitrary code in a program. As such, this allows such attacks to be mitigated or even prevented.

A method proposed by those skilled in the art to reinforce the CFI of programs involves the introduction of control-flow guard into a program's source or binary code. A control-flow guard inserts a check before an indirect function call. The check makes sure that the target of the indirect function call is an entry of a function, which is currently loaded into the process's memory space. In this method, the control-flow guards are represented by a bitmap structure in memory and the bitmap structure contains all the function entries. The downside to such an approach is that this control-flow guard structure is not sufficiently secure as it assumes that the legitimate targets include all the functions that are loaded into the memory. By exploiting this weakness, an attacker may still take advantage of all the functions in the process to launch an attack.

For the above reasons, those skilled in the art are constantly striving to come up with a device and method to reinforce CFI of software applications.

SUMMARY OF THE INVENTION

Devices and methods to improve the reinforcement of CFI of software applications are set out below in accordance with embodiments of the invention.

A first improvement proposed by embodiments of devices and methods in accordance with the invention is that the CFI checks that are carried out in accordance with the invention are fine grained and are only applied to legitimate targets of the control-flow transfers. Further, as the number of legitimate targets for every function call is reduced, this means that malicious attackers will have lesser functions to exploit.

A second improvement proposed by embodiments of devices and methods in accordance with the invention is that the CFI reinforcements proposed by embodiments of the invention incurs minimal central processing unit (CPU) overheads and as a result, has a minimal impact on the overall performance of the CPU.

A third improvement proposed by embodiments of devices and methods in accordance with the invention is that the invention does not require extreme changes to be made to the original source code or to the compiled binary code.

The above improvements are provided by embodiments of a device in accordance with the invention operating in the following manner.

According to a first aspect of the invention, a device for reinforcing CFI of a software application is disclosed, the device comprising a processor; and a non-transitory media readable by the processor, the non-transitory media storing instructions that when executed by the processor, cause the processor to: receive a first source code file for the software application whereby the first source code file comprises functions and indirect function calls; compile the first source code file to generate a first binary file whereby for each compiled indirect function call, associating a CFI check function to the each compiled indirect function call in the first binary file such that the associated CFI check function will be executed prior to the execution of the each compiled indirect function call; and adding a function, referred to in the each compiled indirect function call, to a reduced function table (RFT).

With reference to the first aspect, in accordance with embodiments of the invention, the device further comprises instructions for directing the processor to: execute the compiled first binary file, whereby for each CFI check function executed, the CFI check function determines if a function referred to in an associated indirect function call is contained within the RFT; and execute the associated indirect function call when it is determined that the function referred to in the associated indirect function call is contained within the RFT.

With reference to the first aspect, in accordance with embodiments of the invention, the device further comprises: instructions for directing the processor to: load the first binary file for execution; update a binary map with an address referred to in a load command when the load command in the first binary file is executed; update a runtime function table with a function referred to in an indirect external function call when an assignment of the indirect external function call is executed in the first binary file; execute the compiled first binary file, whereby for each CFI check function executed, the CFI check function determines if a function referred to in an associated indirect function call is contained within the RFT; and execute the associated indirect function call when it is determined that the function referred to in the associated indirect function call is contained within the RFT.

With reference to the first aspect, in accordance with embodiments of the invention, the device further comprises: instructions for directing the processor to: load the first binary file for execution; update a binary map with an address referred to in a load command when the load command in the first binary file is executed; update a runtime function table with a function referred to in an indirect external function call when an assignment of the indirect external function call is executed in the first binary file; execute the compiled first binary file, whereby for each CFI check function executed, the CFI check function determines if a function referred to in an associated indirect function call is contained within the RFT; execute the associated indirect function call, when it is determined that the function referred to in the associated indirect function call is not contained within the RFT, when the function referred to in the associated indirect function call is contained within a second binary file having an address contained in the binary map, and when the second binary file is determined to have been compiled in a legacy manner.

With reference to the first aspect, in accordance with embodiments of the invention, the device further comprises instructions for directing the processor to: load the first binary file for execution; update a binary map with an address referred to in a load command when the load command in the first binary file is executed; update a runtime function table with a function referred to in an indirect external function call when an assignment of the indirect external function call is executed in the first binary file; execute the compiled first binary file, whereby for each CFI check function executed, the CFI check function determines if a function referred to in an associated indirect function call is contained within the RFT; execute the associated indirect function call, when it is determined that the function referred to in the associated indirect function call is not contained within the RFT, when the function referred to in the associated indirect function call is contained within a second binary file having an address contained in the binary map, when the second binary file is determined to not have been compiled in a legacy manner, and when the function referred to in the associated indirect function call is contained within an RFT associated with the second binary file.

With reference to the first aspect, in accordance with embodiments of the invention, the device further comprises instructions for directing the processor to: load the first binary file for execution; update a binary map with an address referred to in a load command when the load command in the first binary file is executed; update a runtime function table with a function referred to in an indirect external function call when an assignment of the indirect external function call is executed in the first binary file; execute the compiled first binary file, whereby for each CFI check function executed, the CFI check function determines if a function referred to in an associated indirect function call is contained within the RFT; execute the associated indirect function call, when it is determined that the function referred to in the associated indirect function call is not contained within the RFT, when the function referred to in the associated indirect function call is contained within a second binary file having an address contained in the binary map, when the second binary file is determined to not have been compiled in a legacy manner, when the function referred to in the associated indirect function call is not contained within an RFT associated with the second binary file, and when the function referred to in the associated indirect function call is contained in the runtime function table.

With reference to the first aspect, in accordance with embodiments of the invention, the device further comprises instructions for directing the processor to: load the first binary file for execution; update a binary map with an address referred to in a load command when the load command in the first binary file is executed; update a runtime function table with a function referred to in an indirect external function call when an assignment of the indirect external function call is executed in the first binary file; execute the compiled first binary file, whereby for each CFI check function executed, the CFI check function determines if a function referred to in an associated indirect function call is contained within the RFT; execute the associated indirect function call, when it is determined that the function referred to in the associated indirect function call is not contained within the RFT, when the function referred to in the associated indirect function call is contained within a second binary file having an address contained in the binary map, and when the function referred to in the associated indirect function call is contained in the runtime function table.

With reference to the first aspect, in accordance with embodiments of the invention, the runtime function table is stored in a protected non-transitory media readable by the processor.

With reference to the first aspect, in accordance with embodiments of the invention, the binary map is stored in a protected non-transitory media readable by the processor.

With reference to the first aspect, in accordance with embodiments of the invention the indirect function calls comprise indirect function calls assigned as part of a data structure.

With reference to the first aspect, in accordance with embodiments of the invention, the indirect function calls further comprise indirect function calls directly assigned to functions.

With reference to the first aspect, in accordance with embodiments of the invention, the indirect function calls further comprise indirect function calls assigned as assembly function calls.

According to a second aspect of the invention, a method for reinforcing CFI of a software application using a computing device is disclosed, the method comprising: receiving a first source code file for the software application whereby the first source code file comprises functions and indirect function calls; receiving a first binary file which is generated from compiling the first source code and compiled indirect function call, associating a CFI check function to the each compiled indirect function call in the first binary file such that the associated CFI check function will be executed prior to the execution of the each compiled indirect function call; and adding a function, referred to in the each compiled indirect function call, to an RFT.

With reference to the second aspect, in accordance with embodiments of the invention, the method further comprises: executing the compiled first binary file, whereby for each CFI check function executed, the CFI check function determines if a function referred to in an associated indirect function call is contained within the RFT; and executing the associated indirect function call when it is determined that the function referred to in the associated indirect function call is contained within the RFT.

With reference to the second aspect, in accordance with embodiments of the invention, the method further comprises: loading the first binary file for execution; updating a binary map with an address referred to in a load command when the load command in the first binary file is executed; updating a runtime function table with a function referred to in an indirect external function call when an assignment of the indirect external function call is executed in the first binary file; executing the compiled first binary file, whereby for each CFI check function executed, the CFI check function determines if a function referred to in an associated indirect function call is contained within the RFT; and executing the associated indirect function call when it is determined that the function referred to in the associated indirect function call is contained within the RFT.

With reference to the second aspect, in accordance with embodiments of the invention, the method further comprises: loading the first binary file for execution; updating a binary map with an address referred to in a load command when the load command in the first binary file is executed; updating a runtime function table with a function referred to in an indirect external function call when an assignment of the indirect external function call is executed in the first binary file; executing the compiled first binary file, whereby for each CFI check function executed, the CFI check function determines if a function referred to in an associated indirect function call is contained within the RFT; executing the associated indirect function call, when it is determined that the function referred to in the associated indirect function call is not contained within the RFT, when the function referred to in the associated indirect function call is contained within a second binary file having an address contained in the binary map, and when the second binary file is determined to have been compiled in a legacy manner.

With reference to the second aspect, in accordance with embodiments of the invention, the method further comprises: loading the first binary file for execution; updating a binary map with an address referred to in a load command when the load command in the first binary file is executed; updating a runtime function table with a function referred to in an indirect external function call when an assignment of the indirect external function call is executed in the first binary file; executing the compiled first binary file, whereby for each CFI check function executed, the CFI check function determines if a function referred to in an associated indirect function call is contained within the RFT; executing the associated indirect function call, when it is determined that the function referred to in the associated indirect function call is not contained within the RFT, when the function referred to in the associated indirect function call is contained within a second binary file having an address contained in the binary map, when the second binary file is determined to not have been compiled in a legacy manner, and when the function referred to in the associated indirect function call is contained within an RFT associated with the second binary file.

With reference to the second aspect, in accordance with embodiments of the invention, the method further comprises: loading the first binary file for execution; updating a binary map with an address referred to in a load command when the load command in the first binary file is executed; updating a runtime function table with a function referred to in an indirect external function call when an assignment of the indirect external function call is executed in the first binary file; executing the compiled first binary file, whereby for each CFI check function executed, the CFI check function determines if a function referred to in an associated indirect function call is contained within the RFT; executing the associated indirect function call, when it is determined that the function referred to in the associated indirect function call is not contained within the RFT, when the function referred to in the associated indirect function call is contained within a second binary file having an address contained in the binary map, when the second binary file is determined to not have been compiled in a legacy manner, when the function referred to in the associated indirect function call is not contained within an RFT associated with the second binary file, and when the function referred to in the associated indirect function call is contained in the runtime function table.

With reference to the second aspect, in accordance with embodiments of the invention, the method further comprises: loading the first binary file for execution; updating a binary map with an address referred to in a load command when the load command in the first binary file is executed; updating a runtime function table with a function referred to in an indirect external function call when an assignment of the indirect external function call is executed in the first binary file; executing the compiled first binary file, whereby for each CFI check function executed, the CFI check function determines if a function referred to in an associated indirect function call is contained within the RFT; executing the associated indirect function call, when it is determined that the function referred to in the associated indirect function call is not contained within the RFT, when the function referred to in the associated indirect function call is contained within a second binary file having an address contained in the binary map, and when the function referred to in the associated indirect function call is contained in the runtime function table.

With reference to the second aspect, in accordance with embodiments of the invention, wherein the runtime function table is stored in a protected non-transitory media readable by the processor.

With reference to the second aspect, in accordance with embodiments of the invention, wherein the binary map is stored in a protected non-transitory media readable by the processor.

With reference to the second aspect, in accordance with embodiments of the invention, wherein the indirect function calls comprise indirect function calls assigned as part of a data structure.

With reference to the second aspect, in accordance with embodiments of the invention, wherein the indirect function calls further comprise indirect function calls directly assigned to functions.

With reference to the second aspect, in accordance with embodiments of the invention, wherein the indirect function calls further comprise indirect function calls assigned as assembly function calls.

BRIEF DESCRIPTION OF THE DRAWINGS

The above advantages and features in accordance with this invention are described in the following detailed description and are shown in the following drawings.

DETAILED DESCRIPTION

This invention relates to a device and method for a device to reinforce the CFI of a software application as the application is being executed on the device.

In particular, when a source code is being compiled, the invention will generate an RFT based on indirect function calls that have been assigned to function pointers contained within the source code file. The compiler will then compile a CFI check function and this CFI check function is then associated with each compiled indirect function call in the binary file such that when the binary file is executed, an associated CFI check function will be executed prior to the execution of each compiled indirect function call in the binary file. It should be noted that the term program and software application may be used interchangeably throughout the description without departing from the invention.

Still further, if an indirect function call within the source code file calls an external function that is contained in another source code file, a runtime function table will be generated based on the compiled file of the other source code file. In other words, the runtime function table is generated based on the binary file of the other source code file. This runtime function table is then utilized to check if external function calls are legitimate calls whereby illegitimate calls are blocked. This additional checking layer further strengthens the reinforcement of the software application's CFI.

One skilled in the art will recognize that many functional units in this description have been labelled as modules throughout the specification. The person skilled in the art will also recognize that a module may be implemented as electronic circuits, logic chips or any combination of electrical and/or electronic discrete components within a device. Further, one skilled in the art will also recognize that a module may be implemented in software which may then be executed by a variety of processors. In embodiments of the invention, a module may also comprise computer instructions or executable code that may instruct a computer processor to carry out a sequence of events based on instructions received. The choice of the implementation of the modules is left as a design choice to a person skilled in the art and does not limit the scope of this invention in any way.

As understood by those skilled in the art, when the code of a software application is compiled, this causes the code to be translated to machine code which is then executed directly by a processor or a virtual machine. In embodiments of the invention, this machine code may comprise binary code which is stored in the device's memory.

Figure 1:
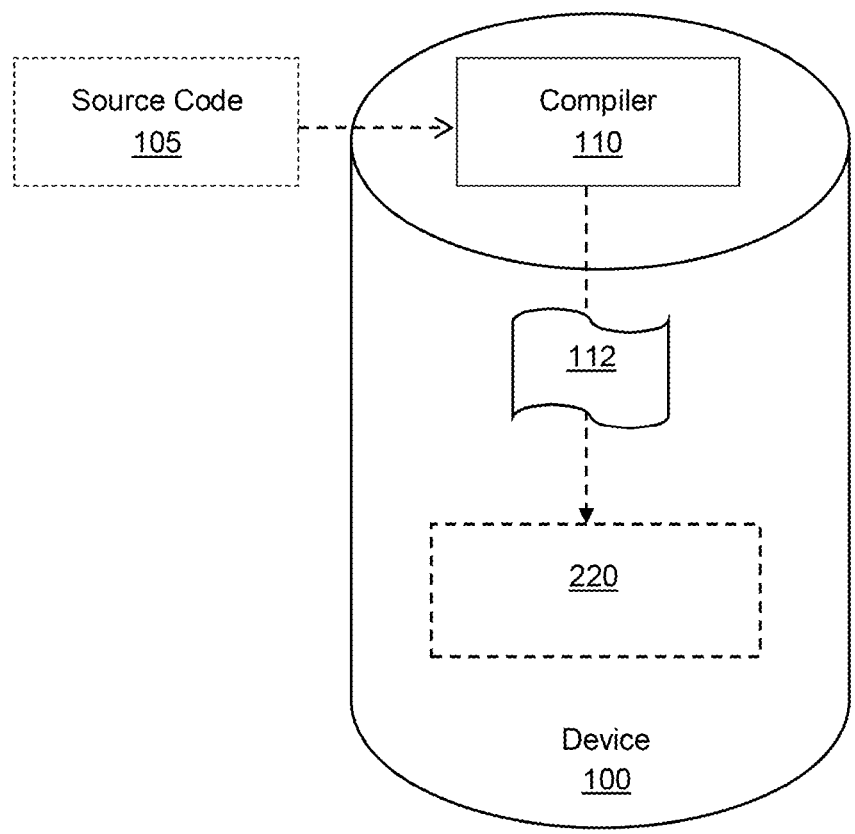
FIG. 1 illustrating an exemplary block diagram of a system to support reinforcement of CFI of a software application in accordance with embodiments of the invention.

FIG. 1 illustrates an exemplary block diagram of a system to support reinforcement of CFI of software applications in accordance with embodiments of the invention. The system illustrated in FIG. 1 includes a device 100 that is configured to receive source codes from various sources. The device 100 may comprise, but is not limited to, any device that is able to carry out computing functions either wirelessly or through wired connections such as servers, computers, tablet computers, mobile computers, or netbooks or any type of computing devices that may be configured to receive and execute instructions. These devices are also provided with a variety of modules for carrying out the various computing and processing functions.

In general, the device 100 is provided with a compiler module 110. The compiler module 110 is configured to receive a source code 105 and to compile the source code 105 to produce a binary file 112. The binary file 112 is then stored in a memory 220 where it is then later executed by the device 100.

In embodiments of the invention, the device 100 may also be provided with a development module (not shown) that is operable to provide an integrated development environment (IDE) for development of software applications. The development module may be configured to support the design, development, testing, and/or deployment of software applications within the device 100. The development module is also configured to support different programming languages and to integrate different modules to simplify the development of software applications. Further, the development module is also configured such that a developer may create and edit source code for a project and compile the source code to execute a software application.

The device 100 may be configured to wirelessly communicate with other devices or external sources through the Internet or wireless networks such as, but are not limited to, cellular networks, satellite networks, telecommunication networks, or wide area networks (WANs). Communications between the device 100 and other external devices may also take place via wired means. Through these communications means, external users may remotely access modules contained within the device 100 to carry out development of software applications or to securely run software applications contained within the device 100.

Figure 2:
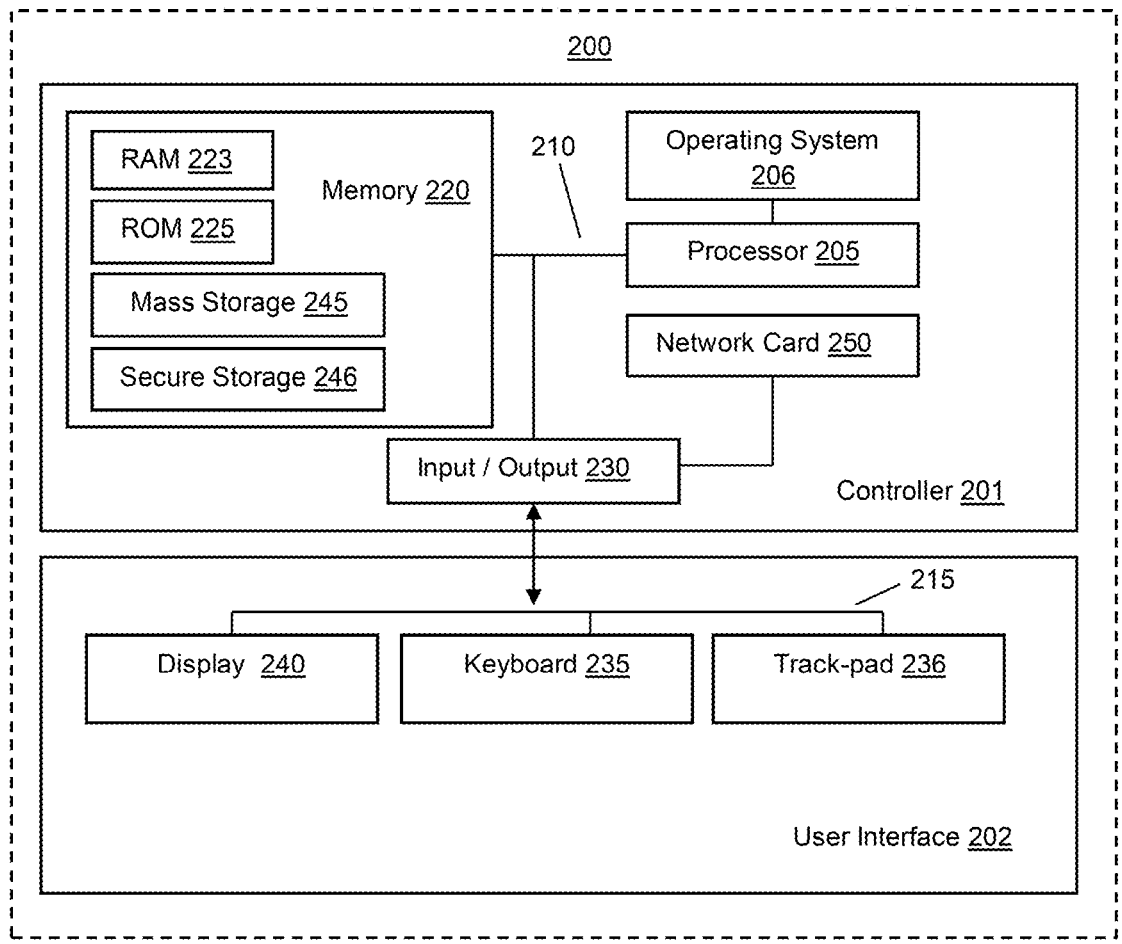
FIG. 2 illustrating a block diagram representative of components in an electronic device for implementing embodiments in accordance with embodiments of the invention.

FIG. 2 illustrates a block diagram representative of components of a module 200 that may be provided within the device 100 for implementing embodiments in accordance with embodiments of the invention. One skilled in the art will recognize that the exact configuration of each wireless device provided within the devices or the access point may be different and the exact configuration of the module 200 may vary and FIG. 2 is provided by way of example only.

In embodiments of the invention, the module 200 comprises a controller 201 and a user interface 202. The user interface 202 is arranged to enable manual interactions between a user and the module 200 and for this purpose includes the input/output (I/O) components required for the user to enter instructions to the control module 200. A person skilled in the art will recognize that components of user the interface 202 may vary from embodiment to embodiment but will typically include one or more of a display 240, a keyboard 235 and a track-pad 236.

The controller 201 is in data communication with the user interface 202 via a bus 215 and includes a memory 220, a processor 205 mounted on a circuit board that processes instructions and data for performing the method of this embodiment, an operating system 206, an I/O interface 230 for communicating with the user interface 202 and a communications interface, in this embodiment in the form of a network card 250. The network card 250 may, for example, be utilized to send data from the electronic device 200 via a wired or wireless network to other processing devices or to receive data via the wired or wireless network. Wireless networks that may be utilized by the network card 250 include, but are not limited to, Wireless-Fidelity (Wi-Fi), Bluetooth, Near Field Communication (NFC), cellular networks, satellite networks, telecommunication networks, WAN, etc.

A memory 220 and the operating system 206 are in data communication with the CPU 205 via a bus 210. The memory components include both volatile and non-volatile memory and more than one of each type of memory, including a random access memory (RAM) 223, a read only memory (ROM) 225 and a mass storage device 245, the last comprising one or more solid-state drives (SSDs) or any other types of drives. A memory 220 also includes a secure storage 246 for securely storing secure data. It should be noted that the contents within the secure storage 246 might only be accessible by a super-user or administrator of the module 200 and might not be accessed by any user of the module 200. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. The memory 220 may include a kernel and/or programming modules such as a software application that may be stored in either volatile or non-volatile memory.

Herein the term "processor" is used to refer generically to any device or component that can process such instructions and may include: a microprocessor, microcontroller, programmable logic device or other computational device. That is, the processor 205 may be provided by any suitable logic circuitry for receiving inputs, processing them in accordance with instructions stored in memory and generating outputs (for example to the memory components or on the display 240). In this embodiment, the processor 205 may be a single core or multi-core processor with memory addressable space. In one example, the processor 205 may be multi-core, comprising—for example—an 8 core CPU.

Figure 3:
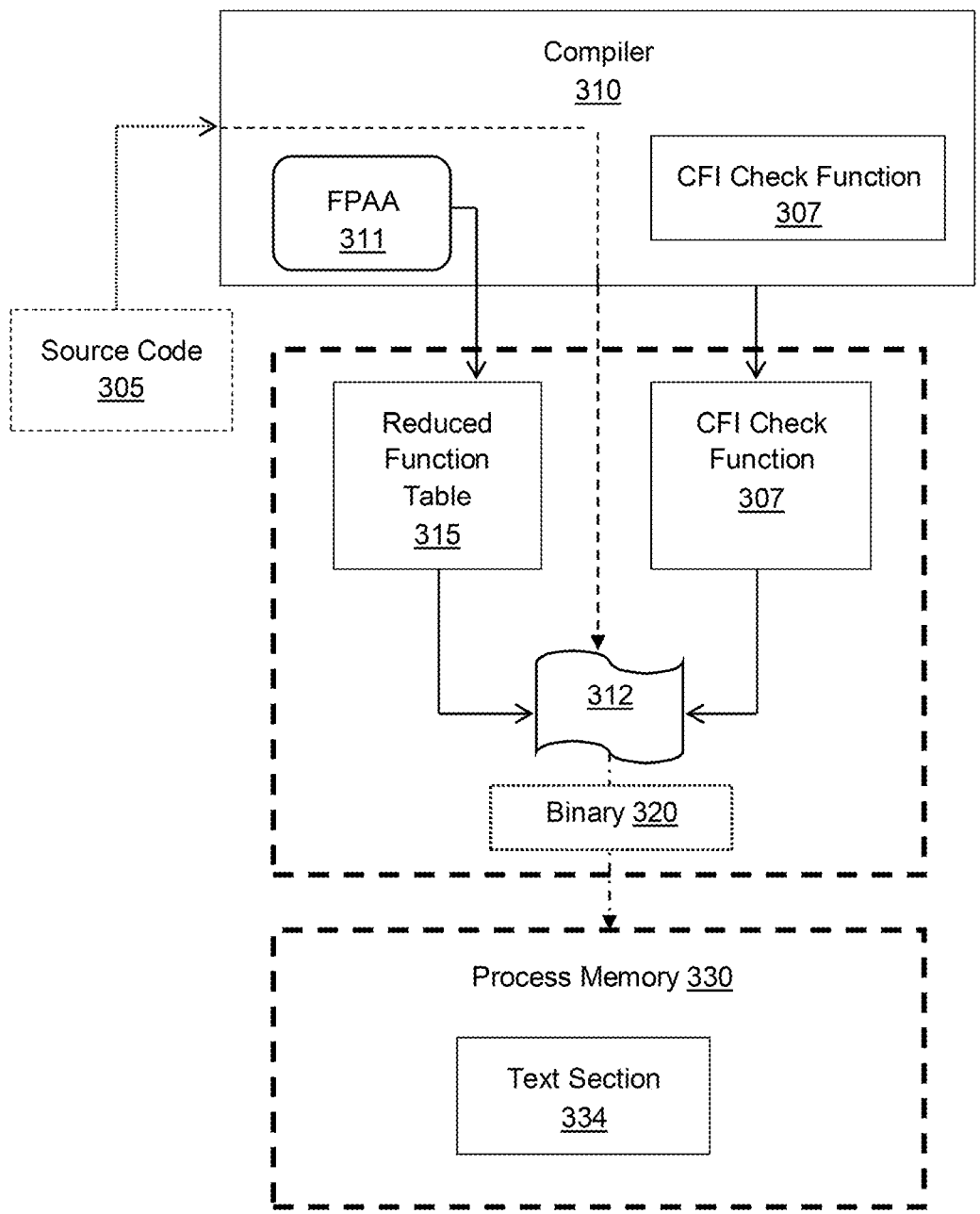
FIG. 3 illustrating a block diagram of a system that compiles source code to generate binary code that is then executed in accordance with embodiments of the invention.

FIG. 3 illustrates block diagrams of a system within the device 100 that is configured to compile source code to generate binary code that is then executed in accordance with embodiments of the invention. In addition to the above, FIG. 3 also illustrates a flow diagram showing the interaction of a source code 305 with a compiler module 310 before a resulting binary file 320 is provided to a memory map 330 where it is then subsequently executed.

In operation, the source code 305 is first provided to the compiler module 310. It should be noted that in embodiments of the invention, a CFI check function 307 is generated by the compiler 310 as a binary code as the compiler 310 begins the compilation of the source code 305. As such, the CFI check function 307 may be called by the compiler 310.

The CFI check function 307 is essentially a function that when called, checks whether a subject function is contained within a target file. In embodiments of the invention, when the CFI check function 307 is called, the CFI check function 307 will determine whether a subject function is contained within the RFT 315. If the subject function is not contained within the RFT 315, the CFI check function 307 will mark the subject function call as a violation and will then prevent the subject function from executing. The generation of the RFT 315 will be described in detail below.

As for the source code 305, the source code 305, for example, comprises code written using any programming language known to those skilled in the art such as, for example, C++ programming language.

In illustrative examples according to embodiments of the disclosure, the compiler module 310 is also provided with a function pointer assignment analysis (FPAA) compiler 311. The FPAA compiler 311 is configured to generate the RFT 315 based on the source code 305 as the source code 305 compiled by the compiler 310. The inner workings of the FPAA compiler 311 is best described using a sample of the source code 305 as illustrated below. One skilled in the art will recognize that the example of the source code 305 is shown as an example only and does not limit the invention in any way.

```
typedef void (*ftype) (void);
void func1 (void) { printf("func1\n");}
void func2 (void) { printf("func2\n");}
void func3 (void) { printf("func3\n");}
struct S {
    ftype s _fp;
} s;
s.s _fp = func1;
```

-continued

```
int main (void) {
    ftype fp = func2;
    __asm__ __volatile__("mov1 $func1, %eax\n", call *%eax");
    return 0;
}
```

As the source code 305 is being compiled by the compiler 310, the FPAA compiler 311 is configured to detect and retrieve all indirect function calls such as, but not limited to, call assignments whereby functions are assigned to function pointers, from the source code 305. In embodiments of the invention, the FPAA compiler 311 is configured to detect indirect function calls assigned as part of a data structure, indirect function calls directly assigned to functions or indirect function calls assigned as assembly (ASM) function calls. Exemplary indirect function calls as extracted from the source code above are set out below.

```
s.s_fp = func1;    ← Data Structure Assignment
ftype fp = func2;  ← Direct Assignment
__("mov1 $func1, %eax\n", ← ASM Assignment
```

One skilled in the art will recognize that from herein, any reference made to an indirect function call may relate to a function pointer or any indirect function call of the type described above.

As the various types of indirect function calls are being detected, functions referred to by these indirect function calls or in these function pointer assignments are then added to the RFT 315. In the example source code shown above, this means that the following functions are eventually all added to the RFT 315.

```
func1;
func2;
```

As the compiler 310 compiles the source code 305, the compiler 310 may simultaneously generate the CFI check function 307.

In operation, the source code 305 will be compiled as normal by the compiler 310 to produce a compiled source code 312. However, when the compiler 310 encounters an indirect function call within the source code 305, the compiler 310 will compile the indirect function call and subsequently associate the compiled indirect function call with the CFI check function 307 in the compiled source code 312 such that when the compiled source code 312 is executed, the CFI check function 307 will be executed or will be run before the compiled indirect function call may be executed. The function referred to by the indirect function call will also be then added to the RFT 315.

In other words, the association of the compiled indirect function call with the CFI check function 307 comprises the CFI check function 307 being inserted into the compiled source code 312 at a line before the binary of the compiled indirect function call such that the CFI check function 307 will be executed by the operating system before the operating system runs the compiled indirect function call.

The process of associating the CFI check function 307 with compiled indirect function calls and the adding of functions referred to by the indirect function calls to the RFT 315 repeats itself until each of the compiled indirect function calls in the source code 305 have been associated with their respective instance of the CFI check function 307 and the RFT 315 has been generated accordingly. At this stage, the binary 320 would then comprise the RFT 315, the CFI check function 307 and the compiled source code 312 whereby the compiled source code 312 would include all the relevant associations or insertions of instances of the CFI check function 307.

The binary 320 is then provided to the process memory 330 which is contained within the memory of the device 100. The compiled source code 312, the RFT 315 and the CFI check function 307 are then extracted from the binary 320 and stored at a text section 334 which is provided within the process memory 330.

The device 100 then proceeds to execute the compiled source code 312 as stored within the text section 334. The compiled source code 312 is run as normal until it encounters the CFI check function 307 previously inserted into the compiled source code 312. When this happens, the device 100 will check the RFT 315 to determine if the function referred to in the indirect function call associated with the CFI check function 307 is contained within the RFT 315. If the device 100 determines that the function referred to in the indirect function call associated with the CFI check function 307 is contained within the RFT 315, the device 100 will then execute the associated indirect function call as normal. The device 100 then continues to execute the compiled source code 312 as normal until another instance of the CFI check function 307 is detected and the process described above is then repeated.

Conversely, if at any stage the device 100 determines that the function call referred to in the indirect function call associated with encountered instance of the CFI check function 307 is not contained within the RFT 315, the device 100 will then abort the execution of the associated indirect function call as this means that a violation has occurred. The device 100 may, at this stage, be configured to skip the affected indirect function call and continue with the execution of the binary 320, raise an alert informing an administrator that a violation has occurred, or the device 100 may be configured to abort the running of the binary 320 completely.

Figure 4:
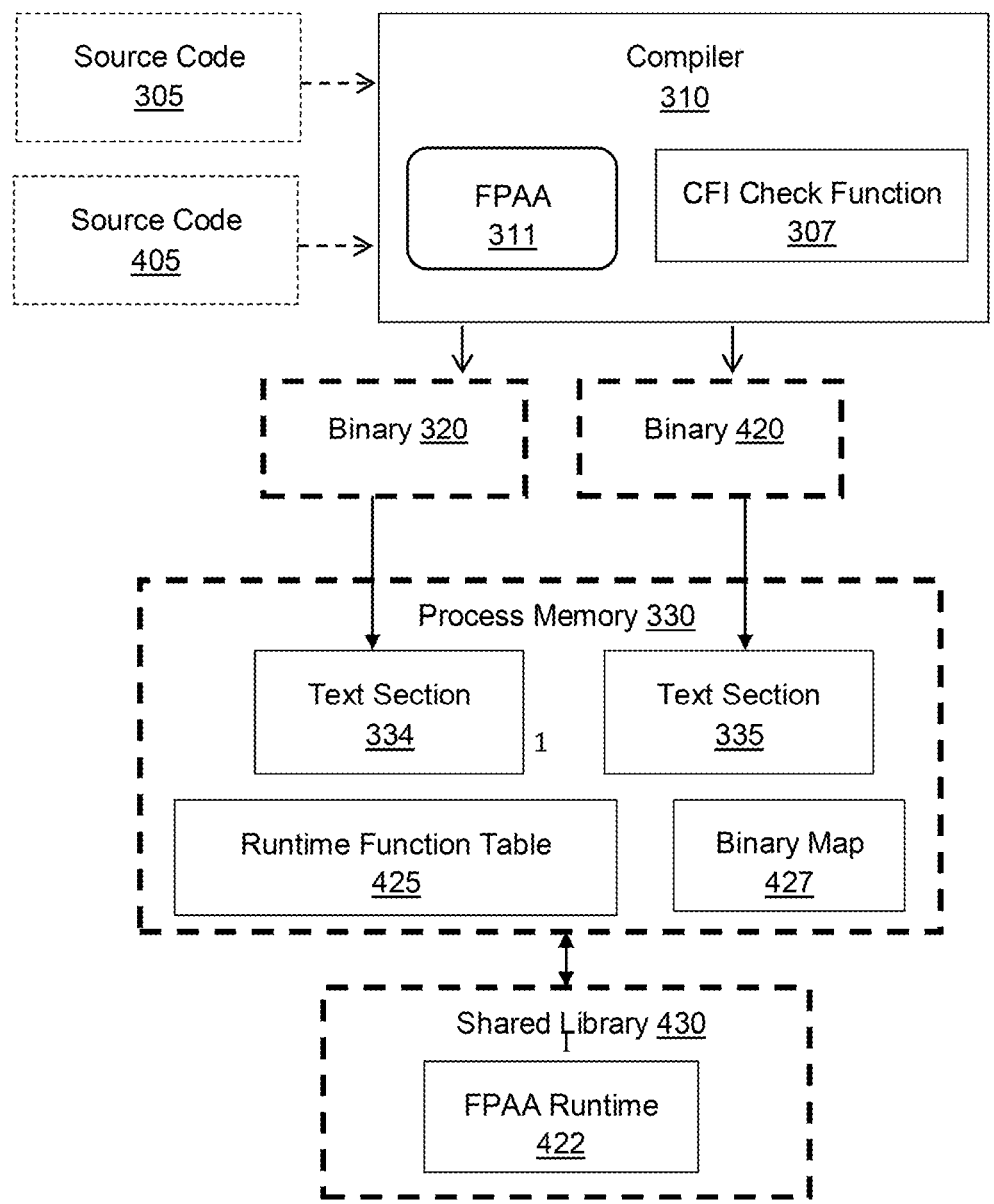
FIG. 4 illustrating a block diagram of a system that compiles two different source codes to generate a single binary code that is then executed in accordance with embodiments of the invention.

FIG. 4 illustrates block diagrams of a system within the device 100 that is configured to compile two different source codes to generate binary code that is then executed in accordance with embodiments of the invention.

In operation, the source code 305 and a source code 405 are similarly provided to the compiler module 310 while the CFI check function 307 is generated by the compiler module 310. The functions of the FPAA compiler module 311, the compiler module 310 and the CFI check function 307 are as previously described in relation to FIG. 3. However, in the embodiment illustrated in FIG. 4, the source code 305 contains indirect function calls to functions found in the source code 405. In other words, the source code 405 contains external function calls originating from the source code 305.

Another example of the source code 305 is provided below together with an example of the source code 405. One skilled in the art will recognize that the source codes 305 and 405 are provided as examples only and do not limit the invention in any way.

```
305
void funcA2 (void) { printf("funcA2\n");}
void funcA3 (void) { printf("funcA3\n");}
funcA1() {
    load 405;
```

```
    f1 = dlsym(405, "funcB");
    f1( );
    f2 = funcA2;
    f2( ); }
405
void funcB (void) { printf("funcB\n");}
```

In the example illustrated above, when the compiler 310 receives and begins to compile the source code 305, the FPAA compiler 311 will detect indirect function calls contained within the compiler 310. Functions referred to by these indirect function calls will then be added to an RFT. As the compiler 310 begins to compile the source code 305, the compiler 310 may simultaneously generate the CFI check function 307.

Similarly, the source code 305 will be compiled as normal by the compiler 310 to produce a compiled source code. When the compiler 310 encounters an indirect function call within the source code 305, the compiler 310 will compile the indirect function call and subsequently associate the compiled indirect function call with a CFI check function instance in the compiled source code such that when the compiled source code is executed by an operating system, the associated CFI check function instance will be executed or will be run before the compiled indirect function call may be executed. The function referred to by the indirect function call will also be then added to an RFT.

In this illustrative example of the invention, when the compiler 310 encounters an indirect external function call such as a dlsym( ) function, the compiler 310 will compile this indirect external function call and subsequently associate the compiled indirect external function call with a CFI check function instance in the compiled source code such that when the compiled source code is executed by an operating system, the associated CFI check function instance will be executed or will be run before the compiled indirect external function call may be executed. However, the function call referred to in the indirect external function call (such as dlsym( ) will not be added to the RFT.

The process of associating CFI check function instances with corresponding compiled indirect function calls, indirect external function calls and the adding of functions referred to by certain indirect function calls to the RFT repeats itself until each of the compiled indirect function calls and indirect external function calls in source code 305 have been associated with their respective CFI check function instances and the RFT has been generated accordingly. For completeness, in the example above, this means that the RFT would comprise only "funcA2".

At this stage, the binary 320 would comprise the RFT, the CFI check function and the compiled source code whereby the compiled source code would include all the relevant associations or insertions of the CFI check function instances.

Simultaneously or after binary 320 has been generated, the compiler 310 will proceed to compile the source code 405 in the similar manner described above whereby an RFT is created for the source code 405 and instances of CFI check functions are associated with indirect function calls and/or indirect external function calls in the source code 405.

At this stage, the binary 420 would comprise an RFT associated with the source code 405, the CFI check function and the compiled source code 405 whereby the compiled source code 405 would include all the relevant associations or insertions of the CFI check function. In should be noted that in other embodiments of the invention, the FPAA compiler 311 may be configured to compile source code 405 normally to generate binary 420, i.e. without generating an associated RFT and without associating instances of the CFI check functions to indirect function calls in the compiled source code 405.

The binary 320 and the binary 420 are then provided to the process memory 330 which is contained within the memory of the device 100. An associated RFT, a CFI check function and the compiled source code 305 are then extracted from the binary 320 and stored at a text section 334. Similarly, an RFT and a CFI check function associated with the compiled source code 405 together with the compiled source code 405 are then extracted from the binary 420 and stored at a text section 335.

Further, as illustrated in FIG. 4, a shared library 430 is also provided to the process memory 330 such that when compiled programs are executed by the operating system, the compiled programs may access shared libraries and/or modules stored within the shared library 430.

In particular, contained within the shared library 430 is a function pointer assignment analysis (FPAA) runtime module 422. The FPAA runtime module 422 is configured to detect and update a runtime function table 425 with external functions referred to in indirect external function calls that are declared during the running of a compiled program. It should be noted that the runtime function table 425 is generated by the FPAA runtime module 422 and is stored in the protected memory within process memory 330. In embodiments of the invention, the FPAA runtime module 422 will be triggered when the operating system encounters an assignment of an indirect external function call such as the dlsym( ) function in the compiled source code that is being executed. The external function referred to in the dlsym( ) function is then added to the runtime function table 425. The detailed working of the FPAA runtime module 422 is described in detail in a later section below. Further, it should be noted that the dlsym( ) function referred in this description has been modified from the dlsym( ) function that may be found in the Standard Library (Stdlib). The dlsym( ) function has been modified such that this dlsym( ) function will trigger the FPAA runtime module 422 each time this dlsym( ) function is used in the assignment of an indirect external function call.

In operation, when the operating system executes the compiled source code 305 as stored within the process memory 330, the compiled source code 305 will run as normal until it encounters a "load" operation or command in the compiled source code 305. The "load" operation is essentially a command to load or read another compiled source code in the process memory 330 and/or to load a shared library as contained in the shared library 430. It should be noted that the "load" command referred in this description has been modified from the "load" command that may be found in Stdlib. The "load" command has been altered such that in addition to performing its standard function, when the operating system encounters the "load" operation, a binary map 427 (which is generated by the FPAA runtime module 422 and stored within protected memory within the process memory 330) will be updated with the address of the compiled source code or shared library that is to be loaded into the compiled source code 305. In the example described above, when the operating system encounters the "load 405" command in the compiled source code 305, this means that the address of the compiled source code "405" will be loaded into the binary map 427.

The FPAA runtime module 422 then continues to update the binary map 427 with the addresses of compiled source codes and/or shared libraries as these parameters are loaded by the operating system as the compiled source code 305 is executed.

Further, during the running of the compiled source code 305, when the operating system encounters an indirect external function call such as dlsym( ) function, the FPAA runtime module 422 will be triggered to update the runtime function table 425 with the function referred to in the dlsym( ) function. In the example provided above, this means that when the operating system executes the "f1=dlsym(405, "funcB")" command, the FPAA runtime module 422 will add "funcB" from the compiled source code "405" into runtime function table 425. It should be noted that at this stage, the address of the source code "405" has been loaded and as such, has been added to the binary map 427. The process of updating the runtime function table 425 repeats each time the operating system encounters a dlsym( ) function or a similar function in the compiled source code that is being executed.

Typically, the "load" command will have to be declared before the "dlsym( )" function is declared as the "dlsym( )" function may refer to the binary map 427 to obtain the address of the external source code referred to in the "dlsym( )" function. One skilled in the art will recognize that this is not a requirement and that the invention also covers other variations in the arrangement of the functions and/or commands.

As the operating system executes the compiled source code 305, when the operating system encounters a CFI check function that has been previously inserted into the compiled source code 305, the operating system will first check if the function referred to in the indirect function call associated with the CFI check function is contained within the RFT 315. For brevity, from herein, any references made to indirect function calls refers to both indirect function calls and indirect external function calls unless explicit distinctions are made. If the operating system determines that the function referred to in the indirect function call associated with the CFI check function is contained within the RFT associated with the compiled source code 305, the device 100 will then execute the associated indirect function call as normal.

Conversely, if the operating system determines that the function call referred to in the indirect function call associated with the CFI check function is not contained within the RFT associated with the source code 305, the operating system will attempt to determine whether the CFI check function is associated with an indirect external function call. The operating system does this by attempting to retrieve the address referred to in the indirect function call from the binary map 427. If the operating system is unable to obtain the relevant address, the operating system will then abort the execution of the associated indirect function call as this means that a violation has occurred.

In the example above, assuming that the function "f1( )" is called by the operating system, i.e. an indirect external function call is called, this means that the operating system will attempt to obtain the address of "405" from binary map 427. As the address of "405" has been previously added into the binary map 427, this address will be loaded by the operating system. The operating system then affirms that the indirect function call is of an indirect external function call type as the address was successfully loaded.

Based on the loaded compiled source code 405, the operating system will then determine if the compiled source code 405 relates to legacy computing code. If the operating system determines that the compiled source code 405 relates to legacy computing code, the operating system will then execute the indirect external function call as normal. In this description, legacy computing code refers to source code that has not been compiled in accordance with embodiments of the invention.

Conversely, if the operating system determines that the compiled source code 405 does not relate to legacy computing code and was instead compiled in accordance with embodiments of the invention, the operating system will then check an RFT associated with the compiled source code 405 to determine if the function referred to in the indirect external function call is contained therein. If the function referred to in the indirect external function call is contained in the associated RFT, the indirect external function call is then executed as normal by the operating system.

If it is not contained in the associated RFT, the operating system then proceeds to check if the function referred to in the indirect external function call is contained in the runtime function table 425. In this example, as the FPAA runtime module 422 had previously added "funcB" (i.e. the function referred to in f1( )" into the runtime function table 425, this means that the operating system will determine that "funcB" is present in the runtime function table 425. The operating system will then execute the indirect external function call, "f1( )", as normal. If the function referred to in the indirect external function call is not contained in the runtime function table 425, the operating system then aborts the running of the program as this means that a violation has occurred. The device 100 may at this stage be configured to both skip the affected indirect function call and raise an alert to an administrator or device 100 may be configured to abort the running of the binary 320 completely.

In accordance with embodiments of the invention, a method for a device to reinforce CFI of a software application comprises the device carrying out the following steps:

Step 1, receive a first source code file for the software application whereby the first source code file comprises functions and indirect function calls;

Step 2, compile the first source code to generate a first binary file whereby the compiling the first source code comprises for each indirect function call compiled, Sub-step (a), associating a CFI check function to the each compiled indirect function call in the first binary file such that the associated CFI check function will be executed prior to the execution of the each compiled indirect function call; and Sub-step (b), adding a function, referred to in the each compiled indirect function call, to an RFT.

In order to provide such a method, a process is needed for configuring the device to reinforce the CFI of a software application. The following description and FIGS. 5-7 describes embodiments of processes that provide the necessary steps in accordance with this invention.

Figure 5:
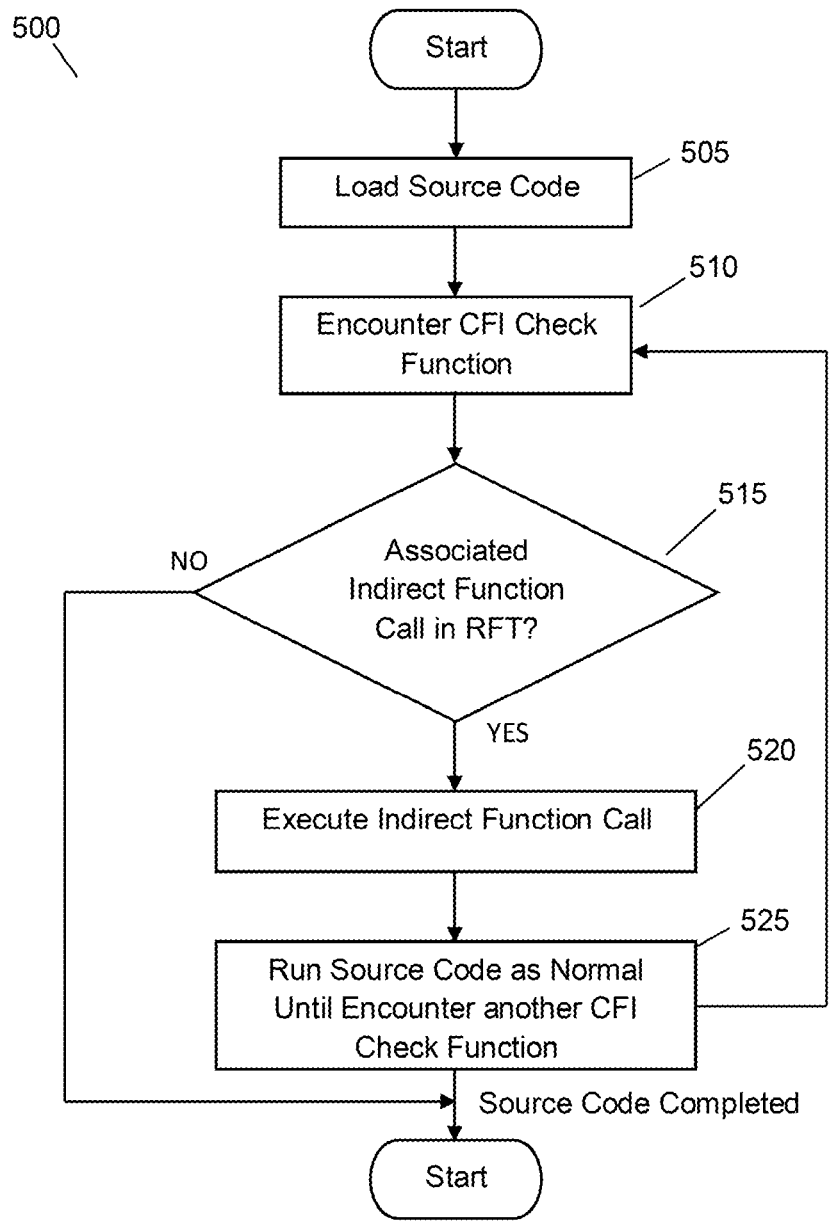
FIG. 5 illustrating a flow diagram showing a process that is performed by a device during runtime of a source code that has been compiled in accordance with embodiments of the invention.

FIG. 5 illustrates a process 500 that is performed by a device during runtime of a source code that has been compiled in accordance with embodiments of the invention. The process 500 begins at step 505 by loading a source code file that has been compiled in accordance with embodiments of the invention. It should be noted that during the compilation of this source code, CFI check functions have been associated with indirect function calls and an RFT has been generated based on the indirect function calls found in the compiled source code.

The process 500 then runs the loaded source code as normal. When the process 500 encounters a CFI check function that has been previously inserted into the source code at step 510, the process 500 will identify an indirect function call associated with the CFI check function. The process 500 then determines at step 515 if the function referred to in the identified indirect function call is contained within the previously generated RFT. If the process 500 determines that the function referred to in the indirect function call is not contained within the RFT, the process 500 will then abort the running of the loaded source code as this means that a violation has occurred. The process 500 then ends.

Conversely, if the process 500 determines that the function referred to in the identified indirect function call is contained within the previously generated RFT, the process 500 will proceed to step 520. At step 520, the process 500 will then execute the indirect function call as normal. Once this is done, the process 500 then proceeds to step 525 whereby process 500 continues the execution of the source code as normal until the process 500 encounters another CFI check function or until all the code in the source code has been executed. If another CFI check function is encountered, the process 500 will return to step 510. The process 500 then repeats steps 510 to 525. Once all the code in the source code has been executed, the process 500 then ends.

Figure 6:
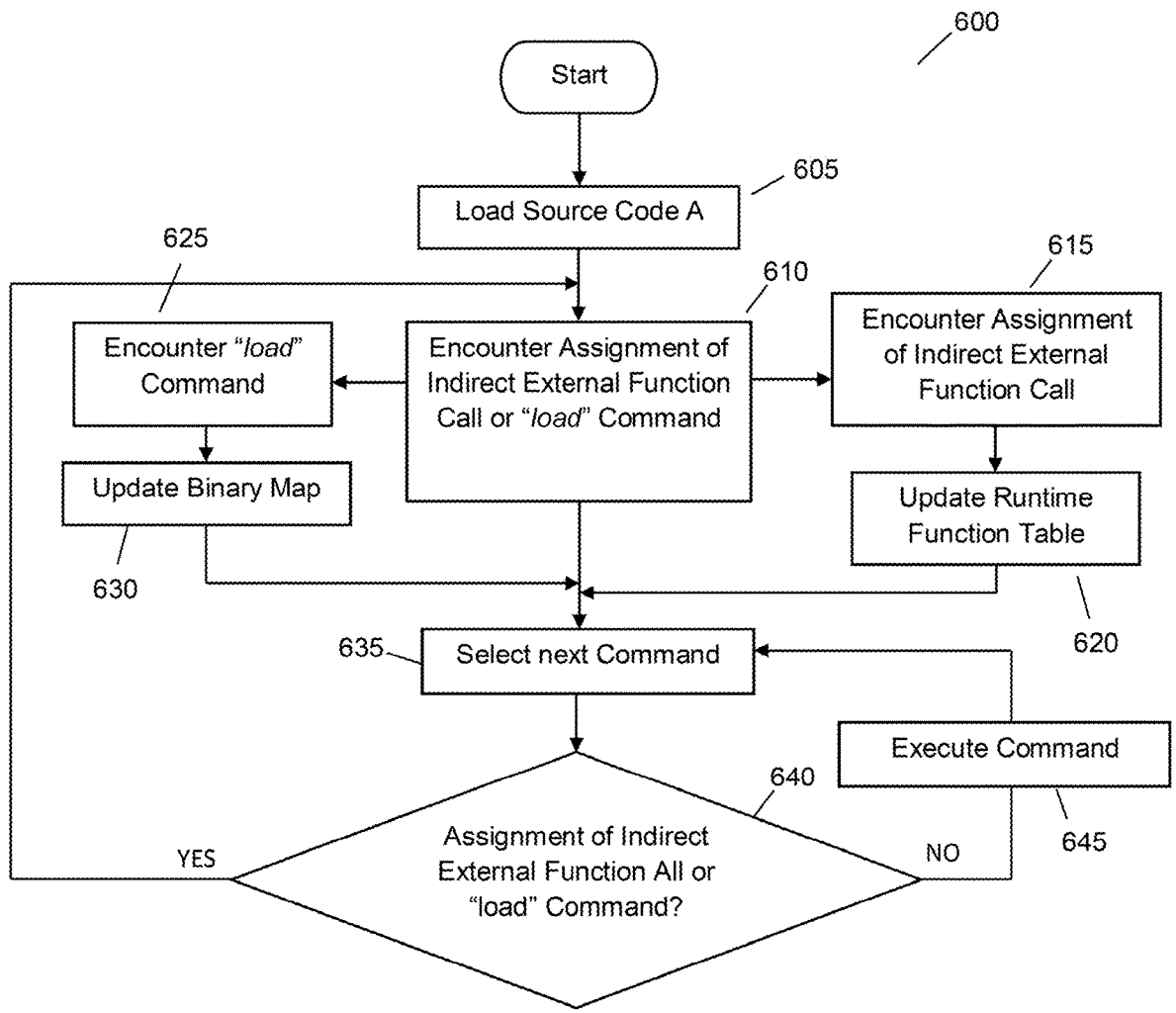
FIG. 6 illustrating a flow diagram showing a process that is performed by a device during runtime of a source code in accordance with embodiments of the invention whereby the source code includes indirect function calls.

FIG. 6 illustrates a process 600 that is performed by a device during runtime of source code A that has been compiled in accordance with embodiments of the invention whereby this source code A includes indirect function calls and indirect external function calls to functions in source code B. The process 600 begins at step 605 with the device loading the compiled source A. It should be noted that during the compilation of source code A, CFI check functions have been associated with the indirect external function calls and an RFT has been generated based on the indirect function calls found in the compiled source code A as previously discussed.

When the process 600 encounters an assignment of an indirect external function command or a load command in source code A at step 610, the process 600 will first identify the command that is to take place. If a "load" command is encountered, the process 600 will proceed to step 625 whereby the process 600 then identifies the other source file or library that is to be loaded during the running of source code A. The process 600 then proceeds at step 630 to update a binary map with the address of the source file or library that was identified during the previous step 610. In this embodiment, if the process 600 encounters a "load B" command, this means that the address of source code B will be added to the binary map.

Alternatively, if at step 610 the process 600 encounters an assignment of an indirect external function call, process 600 will proceed to step 615 whereby the process 600 then identifies the function and the external source code or library referred to in the indirect external function call. Based on the external source code referred to in the indirect external function call and the address of the external source code in the binary map, the function referred to in the indirect external function call is then added to a runtime function table by the process 600 at step 620.

The process 600 then proceeds as normal to select the next command in source code A at step 635. For each command that is selected, process 600 will query that command at step 640 to determine if the command comprises another assignment of an indirect external function command or a load command in source code A. If the command satisfies the conditions at step 640, the process 600 then returns to step 610 whereby the process 600 determines at this step the command that occurred. The process 600 then proceeds to either step 615 or 625 as required.

Alternatively, if the process 600 determines at step 640 that the command selected at step 635 does not comprise another assignment of an indirect external function command or a load command in source code A, the process 600 proceeds to step 645 instead to execute the command selected. The process 600 then returns to step 635 to select the next command. The steps in FIG. 6 repeat themselves until all the commands or instructions in source code A have been executed. Process 600 then ends.

Figure 7:
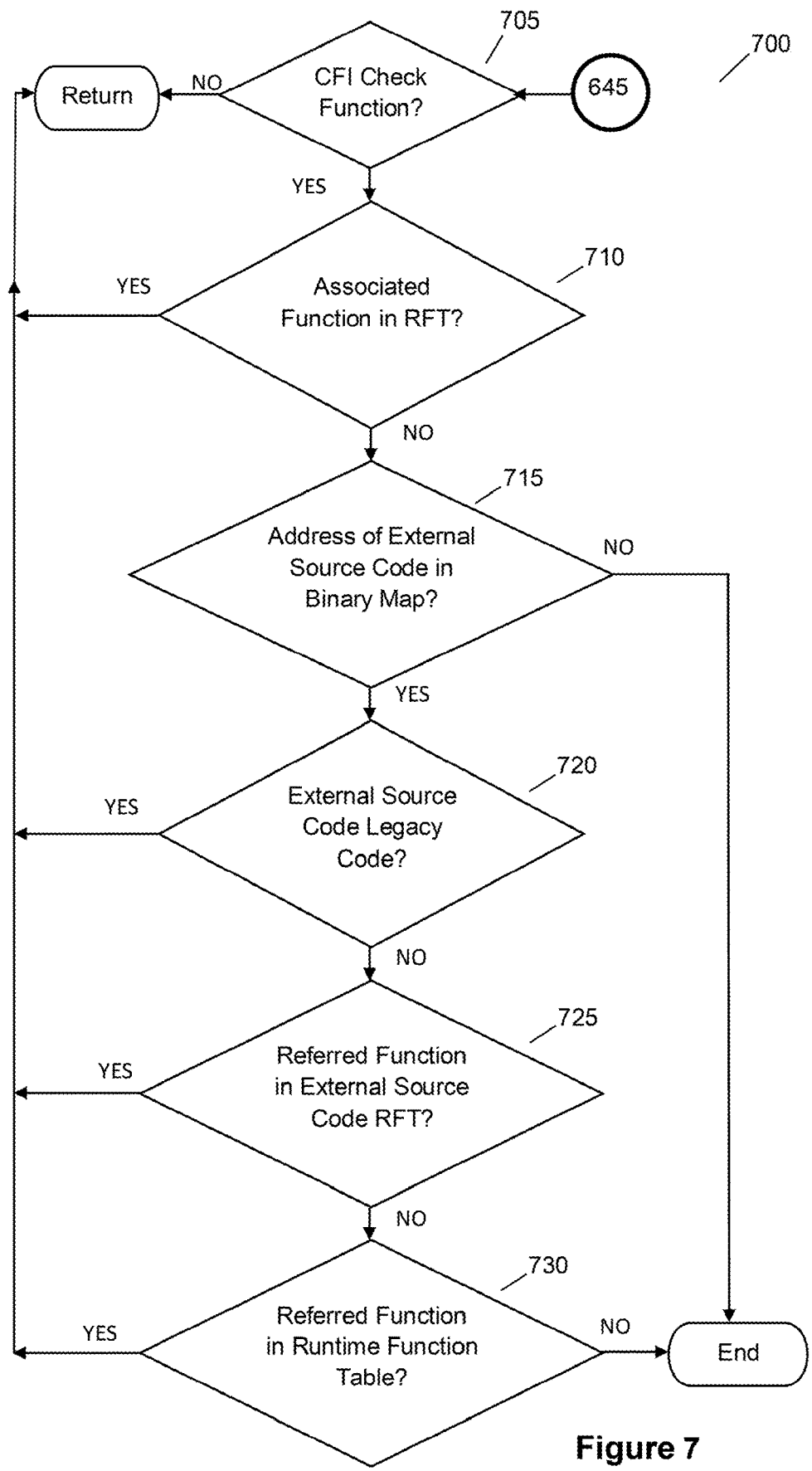
FIG. 7 illustrating a flow diagram showing a process that is performed by the device described in FIG. 6 when the device executes a command in the source code in accordance with embodiments of the invention.

FIG. 7 illustrates a process 700 that is performed by a device during runtime of source code A during the step 645 in the process 600. The process 700 begins when the process 600 attempts to execute the selected command at the step 645.

The process 700 then determines at step 705 if the selected command comprises a CFI check function. If the command is not a CFI check function, the process 700 returns to the step 645 to execute the selected command.

Alternatively, if the process 700 determines at step 705 that the selected command is a CFI check function, the process 700 then proceeds to step 710. At step 710, the process 700 first identifies the indirect function call associated with the CFI check function. The process 700 then checks if the function referred to in the indirect function call is contained within the RFT associated with source code A. If the process 700 determines that the function referred to in the indirect function call is contained within the RFT associated with source code A, the process 700 will then execute the associated indirect function call as normal by returning to the step 645.

Conversely, if the process 700 determines that the function referred to in the indirect function call is not contained within the RFT associated with the source code A, the process 700 will then proceed to step 715. At step 715, the process 700 will attempt to determine whether the CFI check function is associated with an indirect external function call. The process 700 does this by attempting to retrieve the address referred to in the indirect function call from a binary map. If the process 700 is unable to obtain the relevant address, the process 700 will end as this means that a violation has occurred.

In this embodiment, it is assumed that the indirect function call contains an address for source code B. If the process 700 is able to obtain the address referred to in the indirect function call, i.e. address of source code B, this means that the indirect function call is an indirect external function call. The process 700 then proceeds to step 720. At this step, the process 700 then utilizes the address of source code B to determine if the source code associated with the address relates to legacy computing code. If the process 700 determines that the source code B relates to legacy computing code, the process 700 will then execute the indirect external function call as normal by returning to the step 645.

However, if the process 700 determines that the source code B does not relate to legacy computing code and was instead compiled in accordance with embodiments of the invention, the process 700 will then check an RFT associated with the source code B to determine if the function referred to in the indirect external function call is contained therein. This takes place at step 725. If the function referred to in the indirect external function call is contained in the associated RFT of source code B, the indirect external function call is then executed as normal by the process 700 by returning to step 645.

If it is not contained in the associated RFT of source code B, the process 700 then proceeds to check if the function referred to in the indirect external function call is contained in the runtime function table. This takes place at step 730. If the function may be found in the runtime function table, the process 700 will then proceed to step 645 to execute the indirect external function call as normal. However, if the function referred to in the indirect external function call is not contained in the runtime function table, the process 700 then aborts the running of the source code A as this means that a violation has occurred and the process 700 ends.

In embodiments of the invention, once the process 700 has determined that the indirect function call is an indirect external function call at step 715, the process 700 may proceed directly to step 730 where process 700 proceeds to check if the function referred to in the indirect external function call is contained in the runtime function table. If the function may be found in the runtime function table, the process 700 will then proceed to the step 645 to execute the indirect external function call as normal. However, if the function referred to in the indirect external function call is not contained in the runtime function table, the process 700 then aborts the running of the source code A as this means that a violation has occurred and the process 700 ends. In this embodiment of the invention, steps 720 and 725 may be skipped.

In embodiments of the invention, once the process 700 has determined that the indirect function call is an indirect external function call at step 715, the process 700 may proceed directly to step 725 where the process 700 will check an RFT associated with the source code B to determine if the function referred to in the indirect external function call is contained therein. This takes place at step 725. If the function referred to in the indirect external function call is contained in the associated RFT of source code B, the indirect external function call is then executed as normal by the process 700 by returning to step 645.

If not, the process 700 proceeds to step 730 where the process 700 proceeds to check if the function referred to in the indirect external function call is contained in the runtime function table. If the function may be found in the runtime function table, the process 700 will then proceed to the step 645 to execute the indirect external function call as normal. However, if the function referred to in the indirect external function call is not contained in the runtime function table, the process 700 then aborts the running of the source code A as this means that a violation has occurred and the process 700 ends. In this embodiment of the invention, step 720 may be skipped.

The above is a description of embodiments of a device and process in accordance with the present invention as set forth in the following claims. It is envisioned that others may and will design alternatives that fall within the scope of the following claims.

What is claimed is:

1. A method for reinforcing control flow integrity (CFI) of a software application using a computing device, the method comprising:
   obtaining a first binary file by compiling a first source code file received by the device, wherein the first source code file comprises functions and an indirect function call, and wherein the first binary file comprises:
      code generated by compiling the first source code file for the software application, and
      a compiled indirect function call rendered by compiling the indirect function call;
   associating, during compiling the first source code file, a CFI check function in the first binary file with the compiled indirect function call in the first binary file, such that during execution of the first binary file, the CFI check function is executed prior to executing the compiled indirect function call; and
   adding a function, referred to in the compiled indirect function call, to a reduced function table (RTF), and
   wherein the method further comprises:
      loading the first binary file for execution;
      updating a binary map with an address referred to in a load command in accordance with executing the load command in the first binary file;
      updating a runtime function table with a function referred to in an indirect external function call in accordance with executing an assignment of the indirect external function call in the first binary file; and
      executing the compiled first binary file,
   wherein during the executing the first binary file, the CFI check function is executed,
   wherein the method further comprises:
      first determining, in accordance with executing the CFI check function, a function referred to in an associated indirect function call is not contained within the RTF; and
      executing, in accordance with the first determining a function referred to in an associated indirect function call is not contained within the RTF, the associated indirect function call, after further determining:
         the function referred to in the associated indirect function call is contained within a second binary file having an address contained in the binary map, and
         the second binary file is determined to have been compiled in a legacy manner.

2. The method according to claim 1 further comprising:
   executing the first binary file, wherein during the executing the first binary file, the CFI check function is executed multiple times, and wherein during each one of the multiple times the CFI check function is executed, the CFI check function determines a function referred to in an associated indirect function call is contained within the RTF; and
   executing, in accordance with determining the function referred to in an associated indirect function call is contained within the RTF, the compiled indirect function call.

3. The method according to claim 1 further comprising:
   loading the first binary file for execution;
   updating a binary map with an address referred to in a load command in accordance with executing the load command in the first binary file;
   updating a runtime function table with a function referred to in an indirect external function call in accordance with executing an assignment of the indirect external function call in the first binary file;
   executing the first binary file, wherein during the executing the first binary file, the CFI check function is executed multiple times, and wherein during each one of the multiple times the CFI check function is executed, the CFI check function determines a function referred to in an associated indirect function call is contained within the RFT; and executing, in accordance with determining the function referred to in an associated indirect function call is contained within the RFT, the compiled indirect function call.

4. The method according to claim 1 further comprising:
loading the first binary file for execution;
updating a binary map with an address referred to in a load command in accordance with executing the load command in the first binary file;
updating a runtime function table with a function referred to in an indirect external function call in accordance with executing an assignment of the indirect external function call in the first binary file;
executing the first binary file,
wherein during the executing the first binary file, the CFI check function is executed,
wherein the method further comprises first determining, in accordance with executing the CFI check function, a function referred to in an associated indirect function call is not contained within the RTF;
executing, in accordance with the first determining a function referred to in an associated indirect function call is not contained within the RFT, the associated indirect function call, after further determining:
the function referred to in the associated indirect function call is contained within a second binary file having an address contained in the binary map,
the second binary file is determined to not have been compiled in a legacy manner, and
the function referred to in the associated indirect function call is contained within a reduced function table associated with the second binary file.

5. The method according to claim 1 further comprising:
loading the first binary file for execution;
updating a binary map with an address referred to in a load command in accordance with executing the load command in the first binary file;
updating a runtime function table with a function referred to in an indirect external function call in accordance with executing an assignment of the indirect external function call in the first binary file; and
executing the first binary file,
wherein during the executing the first binary file, the CFI check function is executed,
wherein the method further comprises first determining, in accordance with executing the CFI check function, a function referred to in an associated indirect function call is not contained within the RTF; and
executing, in accordance with the first determining a function referred to in an associated indirect function call is not contained within the RFT, the associated indirect function call, after further determining:
the function referred to in the associated indirect function call is contained within a second binary file having an address contained in the binary map,
the second binary file is determined to not have been compiled in a legacy manner,
the function referred to in the associated indirect function call is not contained within a reduced function table associated with the second binary file, and
the function referred to in the associated indirect function call is contained in the runtime function table.

6. The method according to claim 1 further comprising:
loading the first binary file for execution;
updating a binary map with an address referred to in a load command in accordance with executing the load command in the first binary file;
updating a runtime function table with a function referred to in an indirect external function call in accordance with executing an assignment of the indirect external function call in the first binary file;
executing the first binary file,
wherein during the executing the first binary file, the CFI check function is executed,
wherein the method further comprises first determining, in accordance with executing the CFI check function, a function referred to in an associated indirect function call is not contained within the RTF; and
executing, in accordance with the first determining a function referred to in an associated indirect function call is not contained within the RFT, the associated indirect function call, after further determining:
the function referred to in the associated indirect function call is contained within a second binary file having an address contained in the binary map, and
the function referred to in the associated indirect function call is contained in the runtime function table.

7. The method according to claim 1 wherein the runtime function table is stored in a protected non-transitory media readable by the processor.

8. The method according to claim 3 wherein the binary map is stored in a protected non-transitory media readable by the processor.

9. The method according to claim 1 wherein the indirect function call comprises an indirect function call assigned as part of a data structure.

10. The method according to claim 9 wherein the indirect function call further comprises an indirect function call directly assigned to a function.

11. The method according to claim 10 wherein the indirect function call further comprises an indirect function call assigned as assembly function call.

12. An arrangement for reinforcing control flow integrity (CFI) of a software application comprising:
a compiling device including:
a processor; and
a non-transitory media readable by the processor, the non-transitory media storing instructions that, when executed by the processor, facilitate the device carrying out a method comprising:
obtaining a first binary file by compiling a first source code file received by the device, wherein the first source code file comprises functions and an indirect function call, and wherein the first binary file comprises:
code generated by compiling the first source code file for the software application, and
a compiled indirect function call rendered by compiling the indirect function call;
associating, during compiling the first source code file, a CFI check function in the first binary file with the compiled indirect function call in the first binary file, such that during execution of the first binary file, the CFI check function is executed prior to executing the compiled indirect function call; and
adding a function, referred to in the compiled indirect function call, to a reduced function table (RFT); and
an execution device including:
a further processor; and
a further non-transitory media readable by the further processor, the further non-transitory media storing instructions that, when executed by the further processor, facilitate the further device carrying out a method comprising:

loading the first binary file for execution;
updating a binary map with an address referred to in a load command in accordance with executing the load command in the first binary file;
updating a runtime function table with a function referred to in an indirect external function call in accordance with executing an assignment of the indirect external function call in the first binary file; and
executing the first binary file,
wherein during the executing the first binary file, the CFI check function is executed,
wherein the method further comprises:
first determining, in accordance with executing the CFI check function, a function referred to in an associated indirect function call is not contained within the RFT; and
executing, in accordance with the first determining a function referred to in an associated indirect function call is not contained within the RFT, the associated indirect function call, after further determining:
the function referred to in the associated indirect function call is contained within a second binary file having an address contained in the binary map, and
the second binary file is determined to have been compiled in a legacy manner.

13. The device according to claim 12 wherein the method further comprises:
executing the first binary file, wherein during the executing the first binary file, the CFI check function is executed multiple times, and wherein during each one of the multiple times the CFI check function is executed, the CFI check function determines a function referred to in an associated indirect function call is contained within the RFT; and
executing, in accordance with determining the function referred to in an associated indirect function call is contained within the RFT, the compiled indirect function call.

14. The device according to claim 12 wherein the method further comprises:
loading the first binary file for execution;
updating a binary map with an address referred to in a load command in accordance with executing the load command in the first binary file;
updating a runtime function table with a function referred to in an indirect external function call in accordance with executing an assignment of the indirect external function call in the first binary file;
executing the first binary file, wherein during the executing the first binary file, the CFI check function is executed multiple times, and wherein during each one of the multiple times the CFI check function is executed, the CFI check function determines a function referred to in an associated indirect function call is contained within the RFT; and
executing, in accordance with determining the function referred to in an associated indirect function call is contained within the RFT, the compiled indirect function call.

15. The device according to claim 12 wherein the method further comprises:
loading the first binary file for execution;
updating a binary map with an address referred to in a load command in accordance with executing the load command in the first binary file;
updating a runtime function table with a function referred to in an indirect external function call in accordance with executing an assignment of the indirect external function call in the first binary file;
executing the first binary file,
wherein during the executing the first binary file, the CFI check function is executed,
wherein the method further comprises first determining, in accordance with executing the CFI check function, a function referred to in an associated indirect function call is not contained within the RFT; and
executing, in accordance with the first determining a function referred to in an associated indirect function call is not contained within the RFT, the associated indirect function call, after further determining:
the function referred to in the associated indirect function call is contained within a second binary file having an address contained in the binary map,
the second binary file is determined to not have been compiled in a legacy manner, and
the function referred to in the associated indirect function call is contained within a reduced function table associated with the second binary file.

16. The device according to claim 12 wherein the method further comprises:
loading the first binary file for execution;
updating a binary map with an address referred to in a load command in accordance with executing the load command in the first binary file;
updating a runtime function table with a function referred to in an indirect external function call in accordance with executing an assignment of the indirect external function call in the first binary file; and
executing the first binary file,
wherein during the executing the first binary file, the CFI check function is executed,
wherein the method further comprises first determining, in accordance with executing the CFI check function, a function referred to in an associated indirect function call is not contained within the RFT; and
executing, in accordance with the first determining a function referred to in an associated indirect function call is not contained within the RFT, the associated indirect function call, after further determining:
the function referred to in the associated indirect function call is contained within a second binary file having an address contained in the binary map,
the second binary file is determined to not have been compiled in a legacy manner,
the function referred to in the associated indirect function call is not contained within a reduced function table associated with the second binary file, and
the function referred to in the associated indirect function call is contained in the runtime function table.

17. The device according to claim 12 wherein the method further comprises:
loading the first binary file for execution;
updating a binary map with an address referred to in a load command in accordance with executing the load command in the first binary file;

updating a runtime function table with a function referred to in an indirect external function call in accordance with executing an assignment of the indirect external function call in the first binary file;

executing the first binary file, wherein during the executing the first binary file, the CFI check function is executed, wherein the method further comprises first determining, in accordance with executing the CFI check function, a function referred to in an associated indirect function call is not contained within the RFT; and executing, in accordance with the first determining a function referred to in an associated indirect function call is not contained within the RFT, the associated indirect function call, after further determining:

the function referred to in the associated indirect function call is contained within a second binary file having an address contained in the binary map, and the function referred to in the associated indirect function call is contained in the runtime function table.

18. The device according to claim 12 wherein the runtime function table is stored in a protected non-transitory media readable by the processor.

19. The device according to claim 14 wherein the binary map is stored in a protected non-transitory media readable by the processor.

20. The device according to claim 12 wherein the indirect function call comprises an indirect function call assigned as part of a data structure.

21. The device according to claim 20 wherein the indirect function call further comprises an indirect function call directly assigned to a function.

22. The device according to claim 21 wherein the indirect function call further comprises an indirect function call assigned as an assembly function call.

* * * * *